United States Patent
Lui et al.

(10) Patent No.: US 12,079,945 B2
(45) Date of Patent: *Sep. 3, 2024

(54) XR PREFERRED MOVEMENT ALONG PLANES

(71) Applicant: Apple Inc., Cupertino, CA (US)

(72) Inventors: David Lui, Sunnyvale, CA (US); Hon-Ming Chen, San Jose, CA (US); Shuai Song, Cupertino, CA (US); Xiao Jin Yu, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/335,364

(22) Filed: Jun. 15, 2023

(65) Prior Publication Data

US 2023/0326154 A1    Oct. 12, 2023

Related U.S. Application Data (63) Continuation of application No. 17/662,970, filed on May 11, 2022, now Pat. No. 11,715,271, which is a continuation of application No. 17/204,396, filed on Mar. 17, 2021, now Pat. No. 11,354,869.

(60) Provisional application No. 62/990,673, filed on Mar. 17, 2020.

(51) Int. Cl.
*G06T 19/00* (2011.01)
*G06T 15/00* (2011.01)

(52) U.S. Cl.
CPC .......... *G06T 19/006* (2013.01); *G06T 15/005* (2013.01)

(58) Field of Classification Search
None
See application file for complete search history.

(56) References Cited

U.S. PATENT DOCUMENTS

| | | |
|---|---|---|
| 8,884,988 B1 | 11/2014 | Cho |
| 11,055,925 B1 | 7/2021 | Bhushan |
| 2014/0333666 A1 | 11/2014 | Poulos |
| 2015/0221133 A1 | 8/2015 | Groten |
| 2016/0371890 A1 | 12/2016 | Raichelgauz |
| 2017/0323488 A1 | 11/2017 | Mott |
| 2018/0276899 A1 | 9/2018 | Liao |
| 2019/0026936 A1 | 1/2019 | Gorur Sheshagiri |
| 2020/0218074 A1 | 7/2020 | Hoover |

OTHER PUBLICATIONS

Nuernberger, et al., "SnapToReality: Aligning Augmented Reality to the Real World," May 12, 2016.

*Primary Examiner* — Robert J Craddock
(74) *Attorney, Agent, or Firm* — Blank Rome LLP (57) ABSTRACT

Presenting a virtual object includes obtaining, by a first device, a first geometric representation and a second geometric representation corresponding to a physical surface in a real environment, determining an initialization location on the first physical surface for a virtual object, obtaining a first normal for the first representation and a second normal for the second representation at the initialization location, and rendering the virtual object at the initialization location based on the first normal and the second normal.

20 Claims, 8 Drawing Sheets

XR PREFERRED MOVEMENT ALONG PLANES

BACKGROUND

This disclosure relates generally to image processing. More particularly, but not by way of limitation, this disclosure relates to techniques and systems for rendering a virtual object for presentation on a physical surface.

Some devices are capable of generating and presenting extended reality (XR) environments. An XR environment may include a wholly or partially simulated environment that people sense and/or interact with via an electronic system. In XR, a subset of a person's physical motions, or representations thereof, are tracked, and, in response, one or more characteristics of one or more virtual objects simulated in the XR environment are adjusted in a manner that comports with at least one law of physics. However, what is needed is an improved technique for presenting virtual objects.

DETAILED DESCRIPTION

This disclosure pertains to systems, methods, and computer readable media to present a virtual object on a physical surface in a real environment. Specifically, an electronic device may initialize a virtual object so that it appears as if it is placed on a physical surface in the environment as viewed through a display. The electronic device may determine an initialization for a virtual object based on a determined physical geometry of a physical surface on which the object is to be presented. According to one or more embodiments, the electronic device may obtain or otherwise have access to geometric information for the real environment and, particularly, one or more of the physical surfaces in the real environment. In one or more embodiments the electronic device may obtain two or more representations of the geography of a surface in the real environment with varying levels of granularity. As an example, the electronic device may receive a first representation in the form of a plane representation, which indicates a plane in the physical space of the real environment that is associated with the surface. The electronic device may receive a second representation that includes a more granular representation of the geometry of the surface, such as a mesh representation.

According to one or more embodiments, it may be more efficient to utilize the less granular representation of the physical surface than the more granular representation. In one or more embodiments, when determining how to render a virtual object as sitting on a physical surface, the electronic device may initially determine a point on the physical surface at which the virtual object is to be presented. Then, the electronic device may compare the first representation and the second representation. In one or more embodiments, the electronic device may compare a first normal for the less granular representation (i.e., the plane representation), and a second normal for the more granular representation (i.e., the mesh representation) at the initialization point. In one or more embodiments, if the first normal and the second normal are sufficiently similar, then the electronic device uses the less granular representation (i.e., the plane representation) to render and display the virtual object. Further, the electronic device may use the more granular representation (i.e., the mesh representation) to render and display the virtual object if the first normal and the second normal are substantially different. In one or more embodiments, by utilizing the less granular representation if the normals are substantially similar, the electronic device may be optimized by reducing resources required for rendering and presenting the virtual object.

In one or more embodiments, if the mesh representation is used to initialize the object, the mesh representation may be used to determined how the virtual object is moved across the physical surface. As an example, if a user causes the virtual object to appear to move along the surface, the electronic device may render the movement based on the determined representation. As such, if the first normal is sufficiently different than the second normal, then it may be determined, according to one or more embodiments, that the physical surface is not substantially flat, and the more granular representation should be used to determine how to render and display the virtual object. In one or more embodiments, as the virtual object is moved, the electronic device 100 may toggle between representations to determine how the virtual object should be rendered.

The electronic device may initially obtain the geometric representations for only a portion of a physical surface in a physical environment. According to one or more embodiments, as the virtual object is caused to be moved along a surface, the electronic device may experience a lag in receiving an updated representation for the physical surface over which the virtual object is moving. As such, in one or more embodiments, as the virtual object nears the end of the geometric representation of the physical surface, then the electronic device may infer additional geometric data by extending a plane representation in the direction of the movement such that the electronic device can continue to render the virtual object moving along the surface until an updated geometric representation is obtained. In one or more embodiments, upon obtaining the updated geometric representation, the electronic device may update the rendering of the virtual object accordingly.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed concepts. In the interest of clarity, not all features of an actual implementation may be described. Further, as part of this description, some of this disclosure's drawings may be provided in the form of flowcharts. The boxes in any particular flowchart may be presented in a particular order. It should be understood however that the particular sequence of any given flowchart is used only to exemplify one embodiment. In other embodiments, any of the various elements depicted in the flowchart may be deleted, or the illustrated sequence of operations may be performed in a different order, or even concurrently. In addition, other embodiments may include additional steps not depicted as part of the flowchart. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the disclosed subject matter, and multiple references to "one embodiment" or "an embodiment" should not be understood as necessarily all referring to the same embodiment.

It will be appreciated that in the development of any actual implementation (as in any software and/or hardware development project), numerous decisions must be made to achieve a developers' specific goals (e.g., compliance with system- and business-related constraints), and that these goals may vary from one implementation to another. It will also be appreciated that such development efforts might be complex and time-consuming, but would nevertheless be a routine undertaking for those of ordinary skill in the design and implementation of graphics modeling systems having the benefit of this disclosure.

Figure 1:
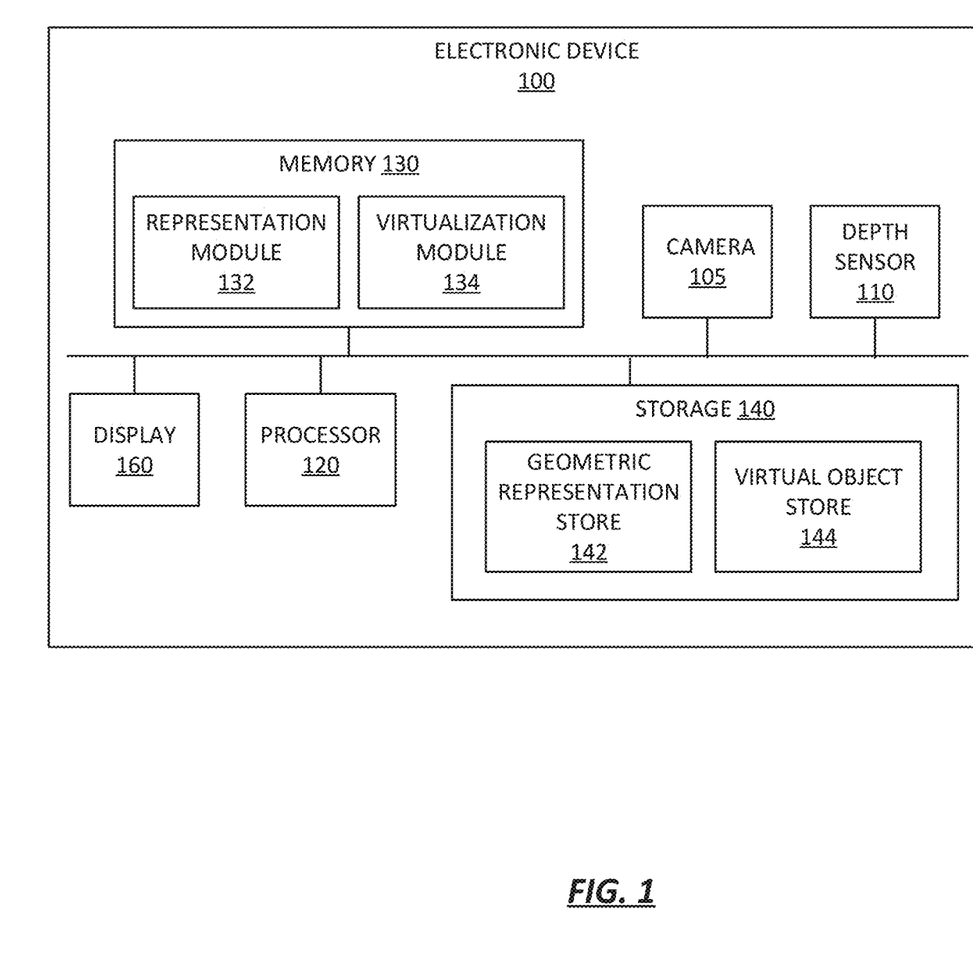
FIG. 1 shows, in block diagram form, a simplified system diagram according to one or more embodiments.

Referring to FIG. 1, a simplified block diagram of an electronic device 100 is depicted, in accordance with one or more embodiments of the disclosure. Electronic device 100 may be part of a multifunctional device, such as a mobile phone, tablet computer, personal digital assistant, portable music/video player, wearable device, base station, laptop computer, desktop computer, network device, or any other electronic device. FIG. 1 shows, in block diagram form, an overall view of a system diagram capable of providing virtual objects for an XR environment. Although not shown, electronic device 100 may be connected to additional devices capable of providing similar or additional functionality across a network, a wired connection, a Bluetooth or other short range connection, among others.

Electronic Device 100 may include processor, such as a central processing unit (CPU) 120. Processor 120 may be a system-on-chip such as those found in mobile devices and include one or more dedicated graphics processing units (GPUs). Further processor 120 may include multiple processors of the same or different type. Electronic Device 100 may also include a memory 130. Memory 130 may each include one or more different types of memory, which may be used for performing device functions in conjunction with processor 120. For example, memory 130 may include cache, ROM, RAM, or any kind of transitory or non-transitory computer readable storage medium capable of storing computer readable code. Memory 130 may store various programming modules for execution by processor 120, including representation module 132 and virtualization module 134. Electronic device 100 may also include storage 140. Storage 140 may include one more non-transitory computer-readable storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Storage 140 may include data utilized by the electronic device 100 to provide an XR environment. It should be understood that according to one or more embodiments, the geometric representation store 142 and the virtual object store 144 may be stored or hosted in different locations within electronic device 100. Further, in one or more embodiments, the geometric representation store 142 and the virtual object store 144 may be stored in alternative or additional locations, such as network devices operatively connected to electronic device 100 across a network, as described above.

In one or more embodiments, electronic device 100 may include other components utilized for vision-based touch detection, such as one or more cameras 105 and/or other sensors such as depth sensors 110. In one or more embodiments, each of the one or more cameras 105 may be a traditional RGB camera, or a depth camera. Further, cameras 105 may include a stereo- or other multi-camera system, a time-of-flight camera system, or the like which capture images from which depth information of a scene may be determined.

In one or more embodiments, electronic device 100 may allow a user to interact with XR environments. There are many different types of electronic systems that enable a person to sense and/or interact with various XR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes.

According to one or more embodiments, the representation module 132 may utilize image information for a physical environment to identify geometric representations of the physical environment. In one or more embodiments, the representation module 132 may obtain multiple geometric representations of varying levels of granularity for a given physical environment. As an example, the representation module 132 may generate one or more of the geometric representations based on data obtained from camera 105, depth sensor 110, and/or other components of electronic device 100 and/or peripheral devices communicably coupled to electronic device 100. In one or more embodiments, the representation module 132 may identify a physical environment in which the electronic device is situated, and obtain one or more predetermined geometric representations for the physical environment, for example from geometric representation store 142 or other storage device to which the electronic device 100 is communicably coupled.

The geometric representations may include varying levels of granularity. In one or more embodiments, the geometric representations may include a plane representation which identifies planar physical surfaces in the physical environment. The geometric representations may also include a mesh representation, which may include a mesh representation of a geometry of an object in the physical environment, such as a physical surface.

In one or more embodiments, the virtualization module 134 is utilized to generate a virtual object for presentation as if it is placed in the physical environment, generating a computer-generated reality. The virtualization module may generate the virtual objects, or may obtain the virtual objects from virtual object store 144 or from elsewhere in network storage. According to one or more embodiments, virtualization module 134 is utilized to render and display a given virtual object to appear as if it is placed on and/or moving across a physical surface in the physical environment. In order to determine a location at which the render and display the virtual object, the virtualization module may utilize one or more of the geometric representations to determine a geometry of a physical surface on which the virtual object is to be rendered. According to one or more embodiments, it may be more efficient to utilize less granular representations when available. As such, the virtualization module may select from multiple geometric representations based on characteristics of the representations of the surface on which the virtual object is to be presented.

Although electronic device 100 is depicted as comprising the numerous components described above, in one or more embodiments, the various components may be distributed across multiple devices. For example, in one or more embodiments, one or more of the representation module 132, and geometric representation store 142 may be distributed differently across the electronic device 100 or elsewhere in additional systems which may be communicably coupled to the electronic device 100. Thus, the electronic device 100 may not be needed to perform one or more techniques described herein, according to one or more embodiments. Accordingly, although certain calls and transmissions are described herein with respect to the particular systems as depicted, in one or more embodiments, the various calls and transmissions may be made differently directed based on the differently distributed functionality. Further, additional components may be used, some combination of the functionality of any of the components may be combined.

Figure 2:
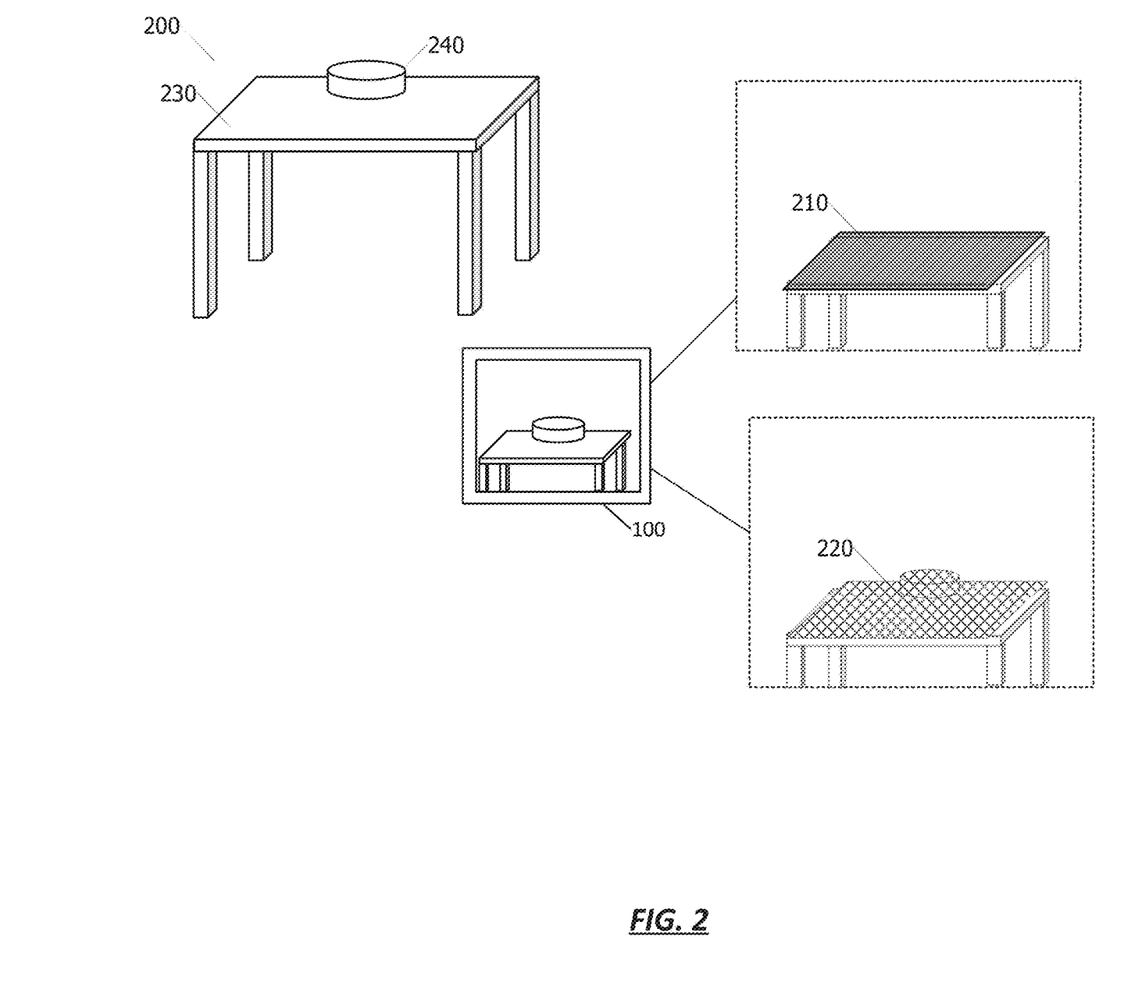
FIG. 2 shows a diagram of example system setup, according to one or more embodiments.

FIG. 2 shows a diagram of an example system setup, according to one or more embodiments. While pertinent features are shown, those of ordinary skill in the art will appreciate from the present disclosure that various other features have not been illustrated for the sake of brevity and so as not to obscure more pertinent aspects of the example among implementations disclosed herein. To that end, as a nonlimiting example, the physical environment 200 includes physical components 230 and 240 depicted through an electronic device 100.

As shown in FIG. 2, the physical environment 200 includes a physical surface 230 depicted as a table. The physical surface 230 may or may not be a flat surface. As an example, as shown in physical environment 200, the physical surface 230 is holding an additional physical object 240 that renders the surface not completely flat.

Electronic device 100 may capture a view of the physical environment 200, according to one or more embodiments. In addition, the electronic device 100 may obtain two or more geometric representations of the physical surface. The geometric representations made be of varying granularity. As an example, geometric representation 210 depicts an example plane representation, which identifies that the physical surface 230 more or less consists of a flat surface. According to one or more embodiments, the plain representation 210 may identify a two dimensional plane in the physical environment corresponding to a physical surface in the physical environment 200. The plane representation may be defined, for example, by three or more points in space representing vertices of the 2D plane. By contrast, geometric representation 220 depicts a mesh representation of the surface of the table, thereby identifying not only the flat portion of the physical surface 230 but also the geometric shape of the additional physical objects 240 sitting atop physical surface 230. According to one or more embodiments, the mesh representation may include a detailed representation of the geometry of the surface of the physical object, such as physical surface 230. As such, the mesh representation may include a three-dimensional representation of the physical surface 230. Accordingly, geometric representation 220 provides a representation of the physical surface 230 with more granularity than the geometric representation 210. According to one or more embodiments, the electronic device 100 may utilize the various geometric representations of the physical surface 230 in order to provide an XR environment by rendering and displaying virtual objects as if they are sitting atop physical surface 230 and/or additional physical objects 240 in the physical environment 200.

Figure 3:
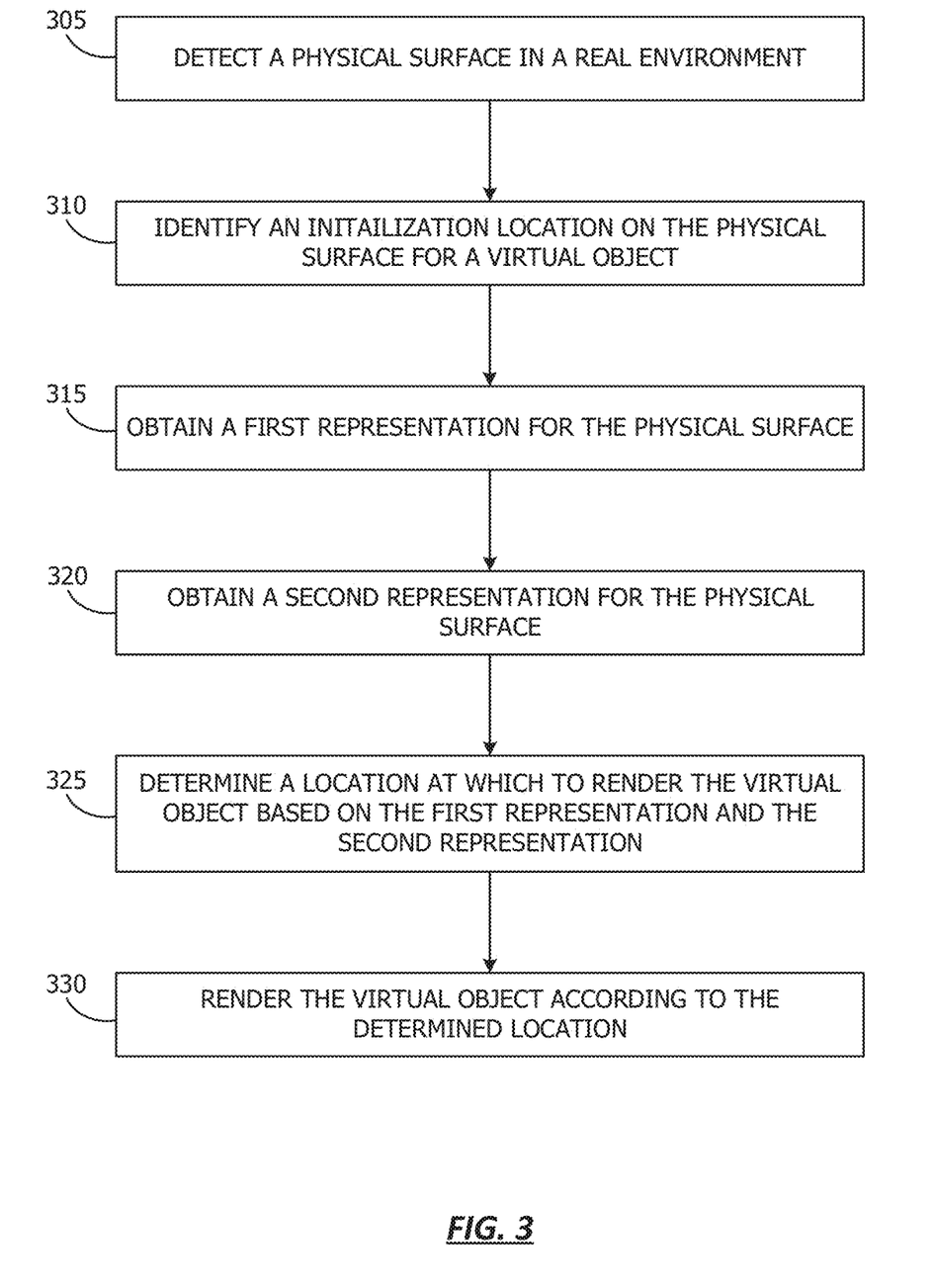
FIG. 3 shows a flowchart of a technique for rendering a virtual object, according to one or more embodiments.

FIG. 3 shows a flowchart of a technique for rendering a virtual object, according to one or more embodiments. Although the various actions are depicted in a particular order, it should be understood that the various actions may be performed in an alternative order. Further, it should be understood that some of the actions may be performed concurrently. In addition, additional actions may be utilized to render the virtual object, and in one or more embodiments, not all actions depicted may be necessary. For purposes of explanation, the following description will be described with respect to the components described above in FIG. 1. However, it should be understood that the various actions may be undertaken by alternative components.

The flowchart begins at 305, where the representation module 132 detects a physical surface in a real environment. According to one or more embodiments, the electronic device 100 may begin by scanning at least a portion of the physical environment in which the electronic device is situated. As an example, the electronic device 100 may utilize cameras or other sensors to identify characteristics of the physical environment. In one or more embodiments, the electronic device 100 may detect the physical surface in the environment, or may identify that the electronic device 100 is in a location with a known physical surface.

The flowchart continues at 310, where the virtualization module 134 identifies and initialization location on the physical surface for a virtual object. As an example, the virtualization module 134 may determine a general location on a physical surface within a view of the display 160. The initialization location may be determined, for example, based on a relative location of the electronic device 100 to the physical surface, such as a location on the physical surface visible at the center of the display 160. As another example, the initialization location may be determined based on user input, or other technique.

At 315, the representation module 132 obtains the first representation for the physical surface. In one or more embodiments, the first representation may include a plane representation. Then, at 320, the electronic device 100 may obtain a second representation for the physical surface. In one or more embodiments, the second representation may include a mesh representation for the physical surface. The first representation and the second representation may include representations of a same portion of the physical environment, with varying levels of granularity. As an example, the plane representation may be less detailed than the mesh representation. As another example, the first representation may be a two-dimensional representation, whereas the second representation may be a three-dimensional representation of the physical surface.

The flowchart continues at 325, where the virtualization module 134 determines the location at which to render the virtual object based on the plain representation and the mesh representation. The location will be a portion of the physical environment onto which the virtual object will appear. The technique for determining the location will be described in greater detail below with respect to FIG. 4. The determined location will identify an area in three-dimensional space at which the virtual object should appear.

The flowchart concludes at 330, where the virtualization module 134 renders the virtual object according to the determined location. The virtual object may be rendered at a scale consistent with the determined location in three-dimensional space. Further, the virtual object may be displayed to appear to a user viewing the physical environment through a display of the electronic device as if the virtual object is sitting on a physical surface in the physical environment.

Figure 4:
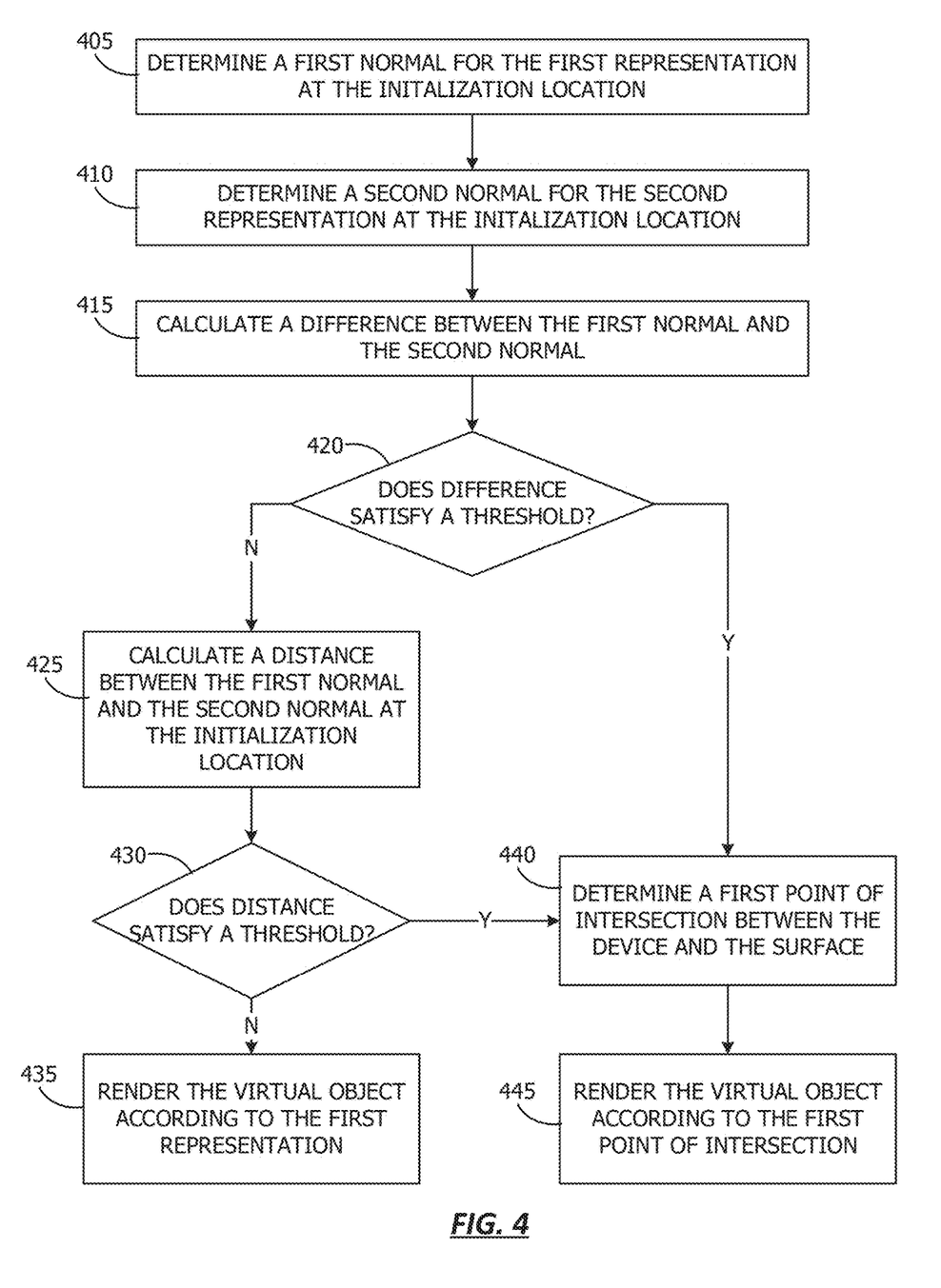
FIG. 4 shows a flowchart of a technique for determining a location at which to render a virtual object, according to one or more embodiments.

FIG. 4 shows a flowchart of a technique for determining a location at which to render a virtual object, according to one or more embodiments. Specifically, FIG. 4 depicts a technique for determining which geometric representation of a physical surface to use when rendering a virtual object. For purposes of clarity, the technique is described with respect to FIG. 1 above, but it should be understood that according to one or more embodiments, the various processes may be performed by alternative components.

The flowchart begins at 405 where the virtualization module 134 determines a first normal for the first representation at the initialization location. As described above, the first representation may be associated with a less granular or less detailed geometric representation of the physical surface in the physical environment. According to one or more embodiments, a determination may be made as to a point or region on a physical surface at which the virtual object should be presented. Then, the first normal may be determined by identifying a point or region on the first representation that corresponds to the point or region on the physical surface at which the virtual object should be presented. The normal is then determined for that point or region on the first representation. In one or more embodiments, the particular point at which the normal is determined may be based on a center of the region, a representative point on the region, or may be determined as a representative normal for the region, or the like.

The flowchart continues at 410 where the virtualization module 134 determines a second normal for the second representation at the initialization location. As described above, the second representation may be associated with a more granular or more detailed geometric representation of the physical surface in the physical environment than the first representation. According to one or more embodiments, a determination may be made as to a point or region on a physical surface at which the virtual object should be presented. Then, the second normal may be determined by identifying a point or region on the second representation that corresponds to the point or region on the physical surface at which the virtual object should be presented. The normal is then determined for that point or region on the first representation. In one or more embodiments, the particular point at which the normal is determined may be based on a center of the region, a representative point on the region, or may be determined as a representative normal for the region, or the like. In one or more embodiments, the first normal and the second normal may be determined in a consistent manner, such as a point on each representation that represents the same point on the physical surface.

The flowchart continues at 415 where a difference is calculated between the first normal and the second normal. The difference may be determined, for example, based on an angular distance between the two normals. At block 420, a determination is made regarding whether the calculated difference satisfies a threshold. As an example, a determination may be made as to whether the difference between the first normal and the second normal is greater than a predetermined threshold difference. In one or more embodiments, the threshold may be a single value, or may be based on characteristics of the physical surface, the virtual object, the electronic device, and the like. As an example, if the electronic device is closer to the physical surface, a smaller threshold value may be used to ensure the virtual object looks realistic in the XR environment. As another example, a particular type of virtual object may be associated with a more refined view and, thus, a smaller threshold value.

If a determination is made at 420 that the difference between the first normal and the second normal does not satisfy a threshold (i.e., the normals are not substantially different), then the flowchart continues at 425 and a distance between the first representation and the second representation at the initialization location is determined. Said another way, for a given point or region on the physical surface at which a virtual object is to be displayed, a distance between a corresponding point or region in the first representation and a corresponding point or region in the second representation is determined. For example, returning to FIG. 2, it is possible that a point on the surface that includes the additional physical object 240 may appear at the surface of the table in the first representation 210, whereas in the second representation 220 it may appear at the top of the additional physical object 240 because of the increased level of granularity of the second representation. As such, the distance may be calculated in three dimensional space as the distance between each of the two points or regions in the geometric representations, within a common coordinate system.

The flowchart continues at 430 where a determination is made regarding whether the calculated distance satisfies a predetermined threshold. In one or more embodiments, the threshold may be a single value, or may be based on characteristics of the physical surface, the virtual object, the electronic device, and the like. As an example, if the electronic device is closer to the physical surface, a smaller threshold value may be used to ensure the virtual object looks realistic in the XR environment. As another example, a particular type of virtual object may be associated with a more refined view and, thus, a smaller threshold value.

In one or more If a determination is made at 430 that the distance does not satisfy a threshold (i.e., the distance is sufficiently small), then the flowchart continues at 435, where the electronic device 100 renders the virtual object according to the first representation. That is, if the difference in plane normal between the first representation and second representation is small, and the distance between the two representations is small, then the less granular representation, such as the plane representation, may be utilized to render the virtual object. According to one or more embodiments, the virtualization module 134 may determine how to render the virtual object based on the first geometric representation such that the virtual object appears to be sitting on the physical surface from the view of a display on the electronic device. Said another way, the virtual object is rendered such that it sits atop the first representation of the physical object so that it appears to be sitting atop the physical object through the display.

If at 420 it is determined that the difference between the first normal and the second normal satisfies a threshold, or if at 430 it is determined that the distance between the first representation and the second representation satisfies a threshold, then the flowchart continues at 440. At block 440, the virtualization module 134 determines a first point of intersection between the device and the surface. In one or more embodiments, the first point of intersection is determined to be one of the first geometric representation and the second geometric representation, from a view vector from the electronic device to the target on the physical surface. The determination will be described below with respect to FIG. 5. The flowchart continues at block 445, where the virtualization module 134 renders the virtual object according to the first point of intersection. That is, if the first point of intersection occurs with the first geometric representation, then the virtualization module 134 renders the virtual object according to the first geometric representation. Conversely, if the first point of intersection occurs with the second geometric representation, then the virtualization module 134 renders the virtual object according to the second geometric representation. Said another way, the virtualization module 134 utilizes the second, more granular, geometric representation to determine how to render the virtual object so that it appears to be sitting atop the physical object through the display.

Figure 5:
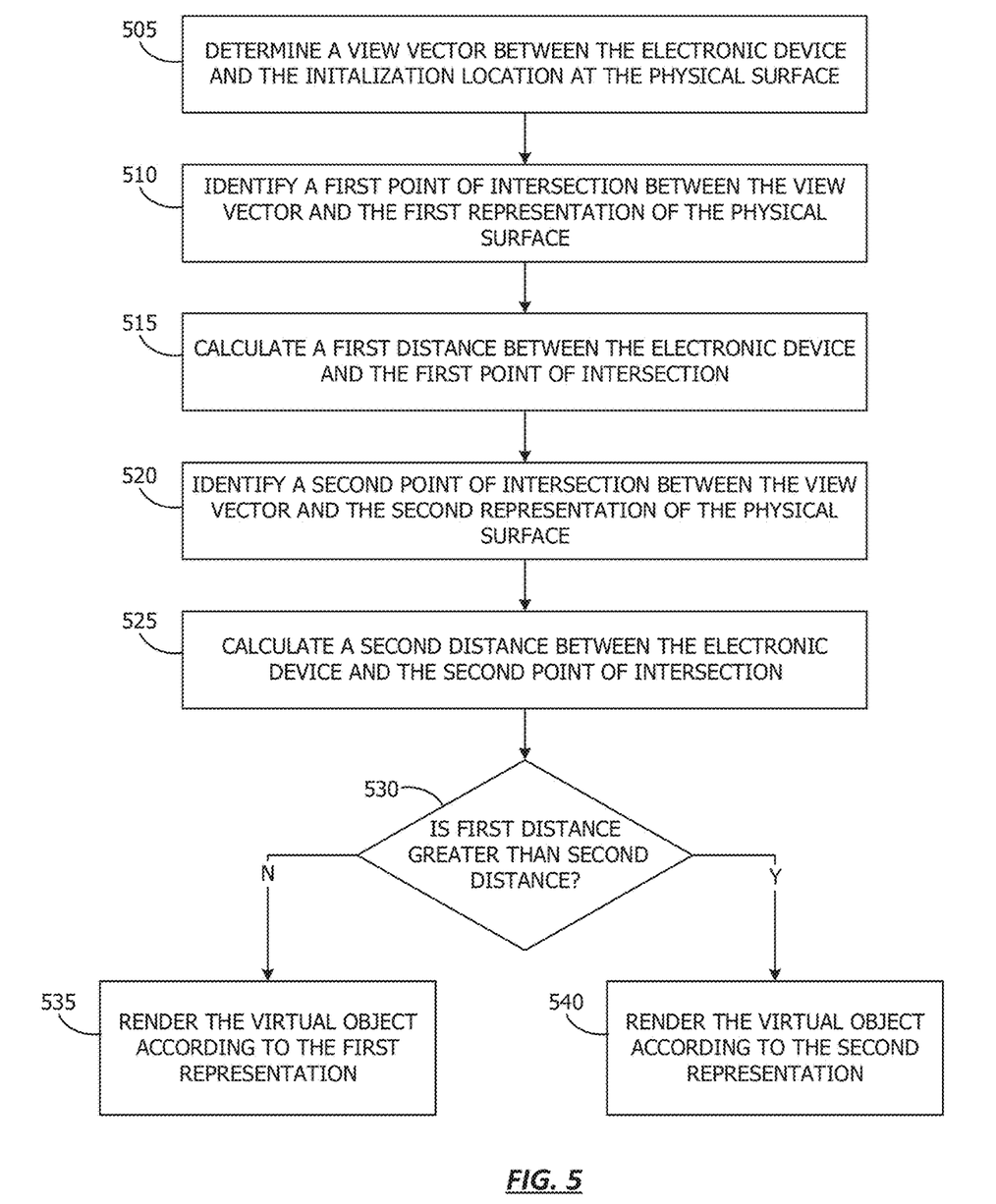
FIG. 5 shows a flowchart of an additional technique for determining a location at which to render a virtual object, according to one or more embodiments.

FIG. 5 shows a flowchart of an additional technique for determining a location at which to render a virtual object, according to one or more embodiments. For purposes of clarity, the flowchart is described with respect to FIGS. 1-2. However, it should be understood that the various components described may be substituted for other components. Additionally, it should be understood that the various processes may be performed in a different order, and not all may be required. Further, according to one or more embodiments, some of the processes may be performed concurrently, or additional processes may be added.

The flowchart begins at 505, where the virtualization module 134 determines a view vector between the electronic device and the initialization location at the physical surface. In one or more embodiments, the view vector may be determined based on a vector originating from some portion of the electronic device, such as the display or the camera capturing the physical surface. As another example, the view vector may be determined based on a portion of the electronic device at which a user's gaze is determined to be targeting. For example, electronic device 100 may include capabilities to perform gaze detection of a user by tracking activity of the user's eyes. The electronic device may determine a portion of the display at which the user is viewing.

As described above, the initialization location may be a portion of the physical surface onto which the virtual object is to be depicted. The initialization location may be determined in any number of ways. For example, the initialization location may be a particular predetermined area of the physical surface as it is visible in the display, such as a central location on the visible portion of the physical surface. As another example, the initialization location may be user-provided or user-selected. For example, a user may select by touch, gaze, or other user input, a location on the physical surface onto which the virtual object is to be depicted. Moreover, the initialization location may the dynamically modified, as a user causes the virtual object to appear to be moving in the physical environment.

The flowchart continues at 510, where the virtualization module 134 identifies a first point of intersection between the view vector and the first representation of the physical surface. As described above, the physical surface may be associated with two or more geometric representations. These geometric representations may include, for example, a plane representation as well as a mesh representation. According to one or more embodiments, these representations may be associated with a region in space corresponding to the physical surface in the physical environment. Because the various representations depict different granularity of the physical surface, the specific regions of space occupied by the various representations may differ.

Turning to the example in FIG. 2, if the initialization location is determined to be on the surface of the additional physical object 240, then the first point of intersection between the electronic device 100 and a portion of the first representation corresponding to the initialization location (on additional physical object 240) will actually fall underneath the additional physical object 240, because the first representation 210 merely depicts the flat tabletop of the physical surface 230. At block 515, the first distance between the electronic device and the first point of intersection is determined. That is, the virtualization module 134 calculates length of the view vector determined at 505 between the electronic device and the first point of intersection determined at 510.

The flowchart continues at 520, where the virtualization module 134 identifies the second point of intersection between the view vector and the second representation of the physical surface. Returning to the example in FIG. 2, if the initialization location is determined to be on the surface of the additional physical objects 240, then the first point of intersection between the electronic device 100 and the portion of the second representation corresponding to the initialization location (on additional physical objects 240) will be on the surface of the additional physical object 240, because the second representation models the textured surface of tabletop of the physical surface 230 that includes the additional physical object 240. At block 525, the second distance between the electronic device and the second point of intersection is determined. That is, the virtualization module 134 calculates length of the view vector determined at 505 between the electronic device and the second point of intersection determined at 520.

The flowchart continues at block 530, and it turned determination is made regarding whether the first distance is greater than the second distance. Said another way, determination is made as to whether of you vector from the electronic device would first intersect with the first representation or the second representation if the two representation were overlaid. As such, the determination at 530 is directed to whether the first representation is the first point of intersection between the device and the physical surface. If at 530, it is determined that the first distance is not greater than the second distance (that is the first representation is not the first point of intersection), then the flowchart continues at 535, and the virtualization module 134 renders the virtual object out of first location corresponding to the initialization location utilizing the first, less granular representation. Conversely, returning to block 530, if it is determined that the first distance is greater than the second distance, then the flowchart continues at 540 and the virtual object is rendered according to the second representation. That is, the virtual object is rendered at a location in space corresponding to the initialization location based on the second representation.

Returning to the example in FIG. 2, considering again that the initialization location is on the surface of the additional physical object 240, the view vector would likely first intersect with the second representation 220, rather than the first representation 210 because the first for presentation 210 does not include the protuberance of the additional object 240 over the surface 230. As such, the virtual object would be rendered according to the second representation 220 appear that it is sitting on the physical surface that includes the additional physical object 240. Otherwise, the virtual object would be rendered such that it appeared to be sitting on the table top without the additional physical object, and thus would be occluded by the additional physical objects 240.

Figure 6:
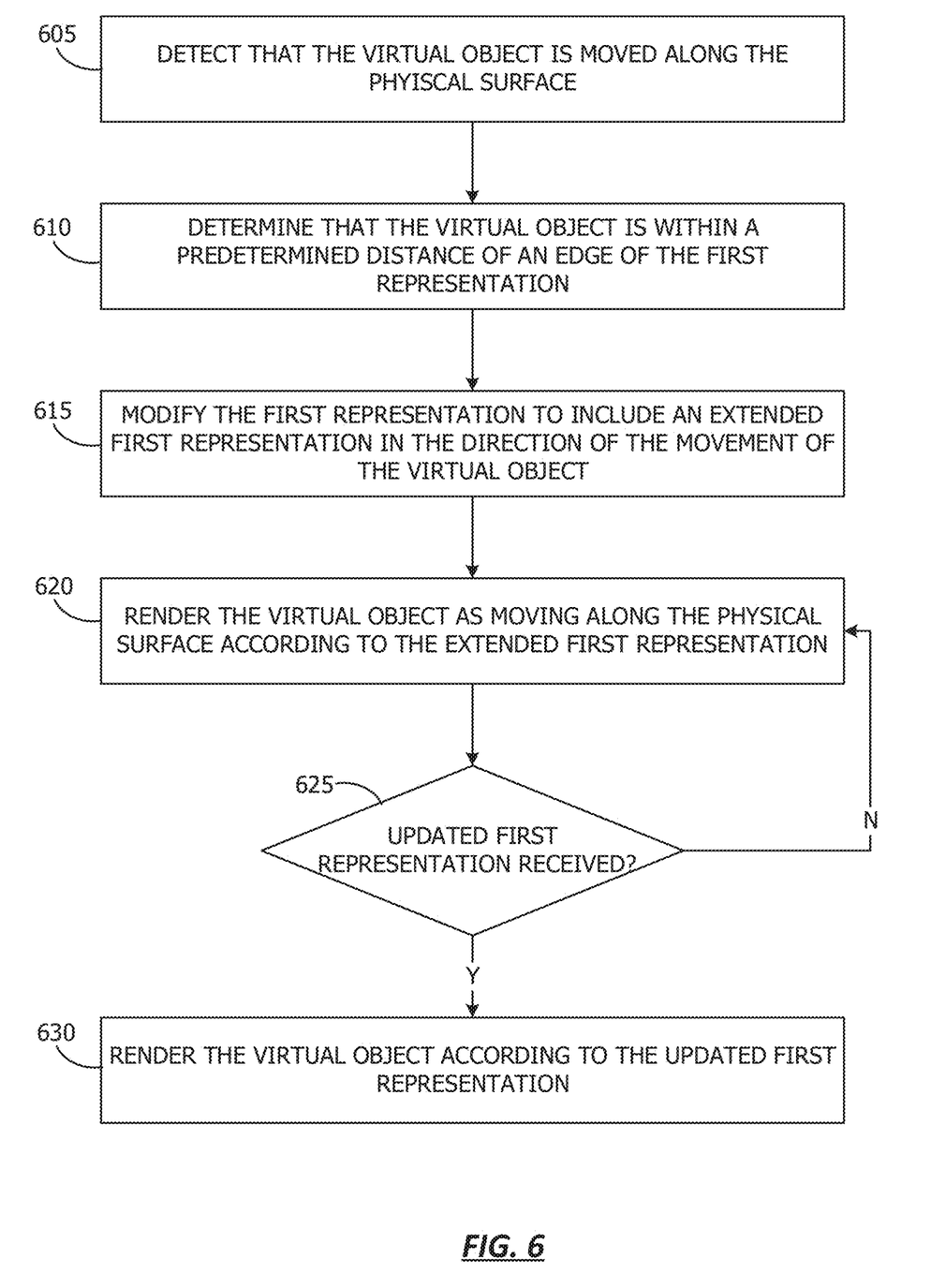
FIG. 6 shows a flowchart of a technique for rending a virtual object as it is moved along a surface, according to one or more embodiments.

FIG. 6 shows a flowchart of a technique for rendering a virtual object as it is moved along the surface, according to one or more embodiments. A virtual object may be moved, for example, based on an automated procedure, user input, and the like. It may be preferable for the virtual objects to appear as if it is sliding along the physical surface.

The flowchart begins at 605, where the virtualization module 134 detects that the virtual object is moved along the physical surface. In one or more embodiments, the movement of the virtual object may include an identifying user input that indicates that the virtual object should be moved along the physical surface. Additionally, or alternatively, the virtual object may be detected to be moved based on automated triggers that cause the movement of the virtual object along the physical surface. According to one or more embodiments, the orientation of the virtual object may remain consistent as it is moved along a surface. As an example, the virtual object may not tilt even if the portion of the surface onto which the virtual object is displayed is uneven.

The flowchart continues at 610, where the virtualization module 134 determines that the virtual object is within a predetermined distance of an edge of the first representation. In one or more embodiments, the electronic device 100 may initially only capture part of the physical surface. As another example, only part of the physical surface in the physical environment may initially be identified as being associated with a particular playing representation. For example, the remaining portion of the physical surface may be out of view or reach of electronic device, or may otherwise not be recognized as being associated with the geometric representation, such as a plain representation.

At 615, the representation module 132 modifies the first representation to include an extended representation in the direction of the movement of the virtual object. Said another way, as the virtual object is moving toward the edge of the physical surface represented by the plain representation, the representation module 132 may modify the geometric representation such that the virtual object can continue to be rendered as if it is moving along the extended representation. Then, at 620, the virtualization module 134 may render the virtual object as moving along the physical surface according to the extended first representation. That is, rather than utilizing a geometric representation that has been determined or otherwise obtained by the electronic device 100, in one or more embodiments, the electronic device 100 may simply extend the geometric representation to compensate for the lack of obtained geometric representation available for the portion of the physical surface.

The flowchart continues at 625, where a determination is made as to whether an updated first representation has been received. For example, as the remaining portion of the physical surface comes into view, or otherwise in reach of the electronic device 100, the electronic device 100 may obtain an updated geometric representation for the physical surface. Until that updated representation is received, the virtualization module 134 continues to render the virtual object is moving along with physical surface according to the extended first representation, as described at 620. However, returning to block 625, if a determination is made that the first updated first representation is received, then the flowchart continues to block 630, where the virtual object is rendered according to the updated first representation.

According to one or more embodiments, the first representation may correspond to a lower granularity representation, such as a plane representation. In one or more embodiments, the electronic device 100 may additionally receive other geometric representations, such as a mesh representation. In one or more embodiments, upon receiving a second geometric representation for the portion of the physical object, the virtualization module 134 may select from the various geometric representations for example according to the techniques described above with respect to FIGS. 3-5.

Figure 7:
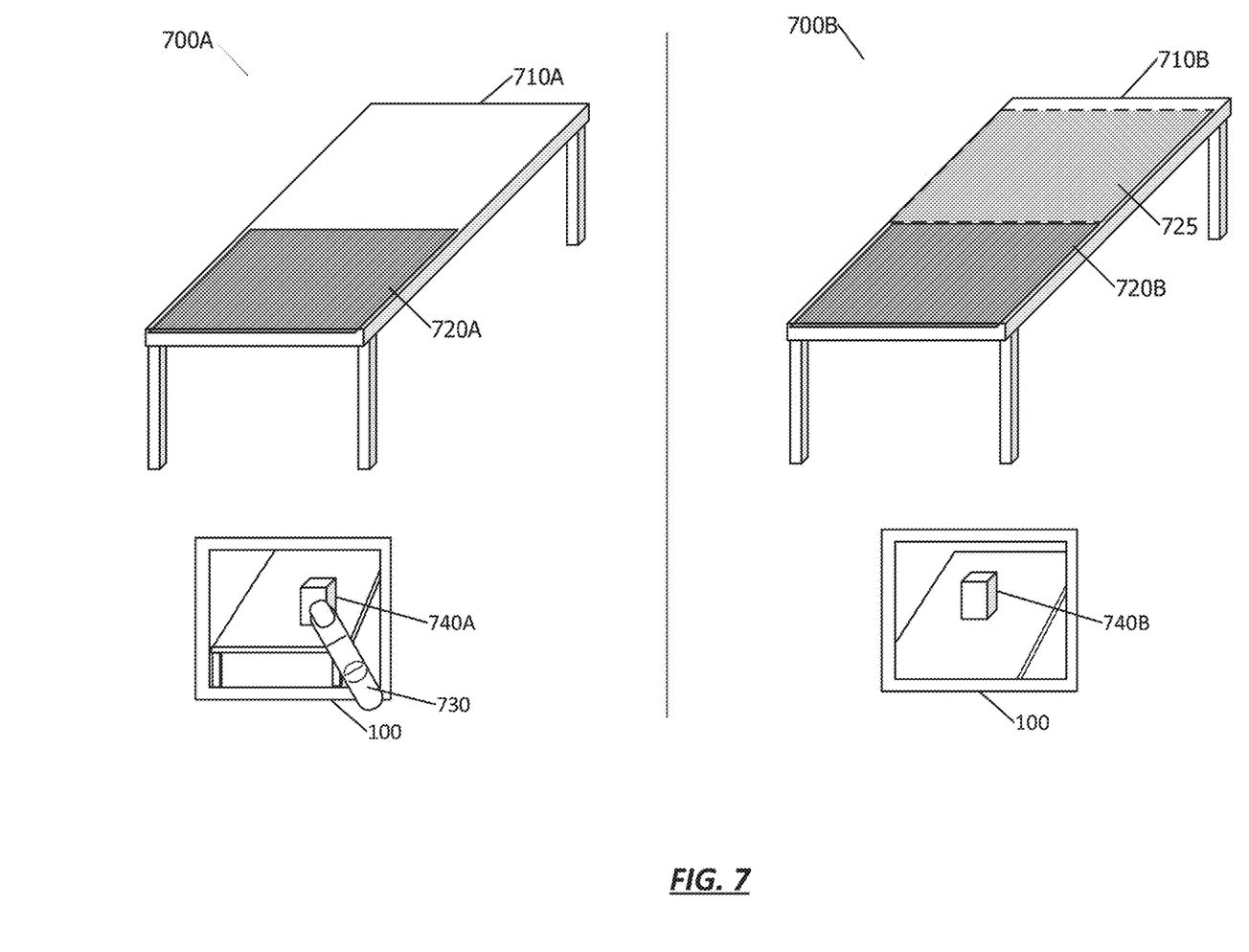
FIG. 7 shows a system setup for rending a virtual object as it is moved along a surface, according to one or more embodiments.

FIG. 7 shows a system set up for rendering a virtual object as it is moved along the surface, according to one or more embodiments. While pertinent features are shown, those of ordinary skill in the art will appreciate from the present disclosure that various other features have not been illustrated for the sake of brevity and so as not to obscure more pertinent aspects of the example among implementations disclosed herein. To that end, as a nonlimiting example, the physical environment 700A includes a first version of the visible environment, whereas physical environment 700B includes a second version of the physical environment after movement of virtual object has occurred.

Physical environment 700A includes a physical surface 710A representative of the top of the table. Electronic device 100 captures of view of the physical environment that includes a portion of the physical surface 710A. Initially, the electronic device 100 may obtain a geometric representation 720A corresponding to a first portion of the physical surface. A user 730 may utilize a touch screen of electronic device 100, for example, to push the virtual object 740A along the view of the physical surface within the display. In one or more embodiments, the user may push the virtual object 740A toward the other side of the table, for which a geometric representation is unavailable. Said another way, the virtual object 740A may be moved across the physical surface by the user, but the geometric representation of the physical surface may not be readily available.

As described above with respect to FIG. 6, when the virtual object 740A is within a predetermined distance of the edge of the geometric representation 720A, and prior to the electronic device obtaining an updated geometric representation of the physical surface 710A, the electronic device 100 may modify the geometric representation of the physical surface in the direction of the movement. As such, in physical environment 700B, the geometric representation 720B of the physical surface 710B includes the extended portion 725. As an example, if the geometric representation 720A includes a plane representation, the extended portion 725 may extend the length of the plane in the direction of the movement of the virtual object. Accordingly, the electronic device 100 may then render the virtual object 740B according to the extended portion such that the virtual object 740B appears to be sitting atop the physical surface 710B. As described above, the electronic device may utilize the extended portion of the geometric representation until an updated geometric representation is received or otherwise obtained by the electronic device. Upon obtaining an updated geometric representation, the electronic device may then re-render the virtual object. In one or more embodiments, by utilizing an extended portion, the electronic device reduces lag in providing a computer generated reality environment.

Figure 8:
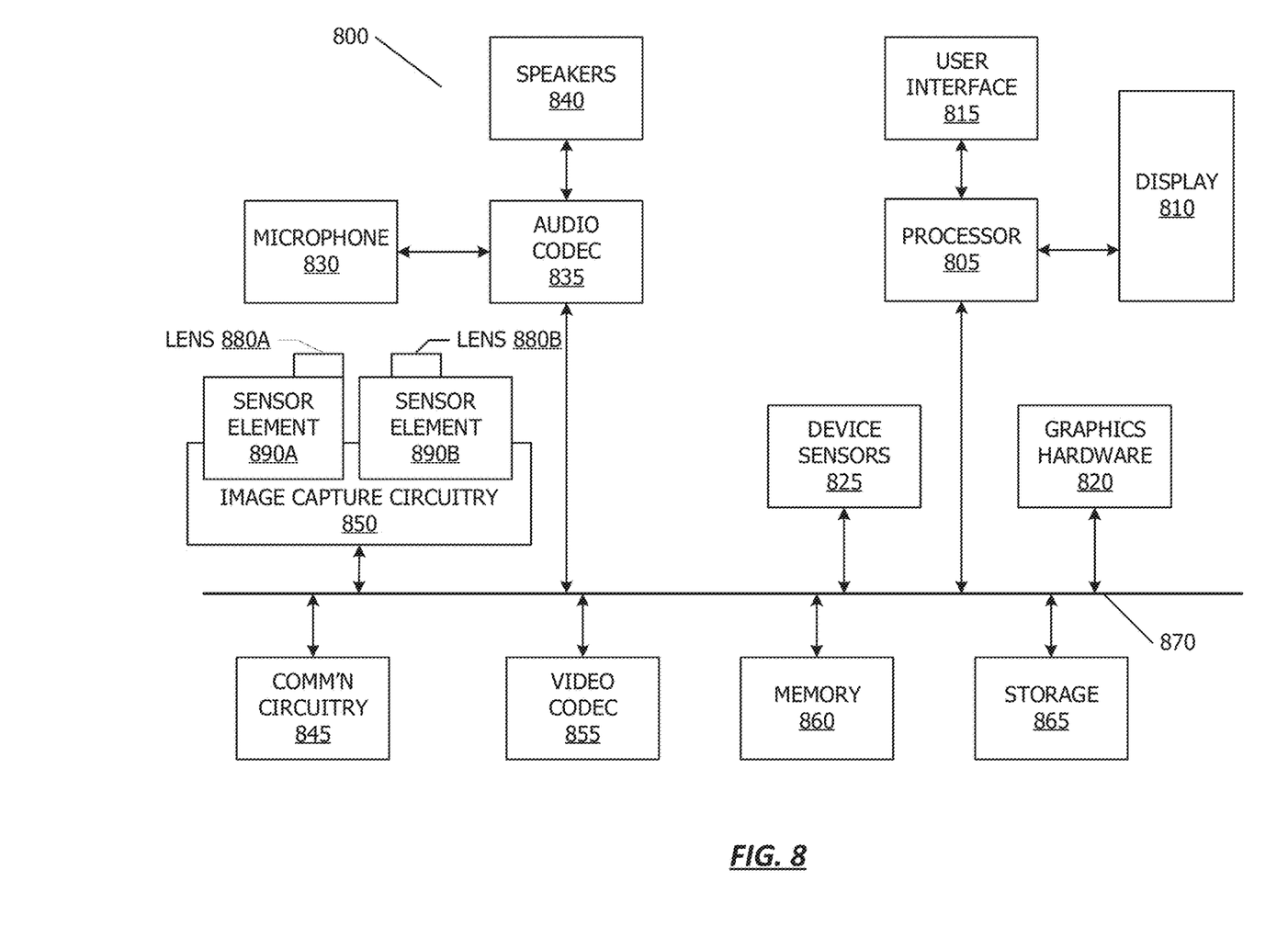
FIG. 8 shows, in block diagram form, a computer system in accordance with one or more embodiments.

Referring now to FIG. 8, a simplified functional block diagram of illustrative multifunction electronic device 800 is shown according to one embodiment. Each of electronic devices may be a multifunctional electronic device, or may have some or all of the described components of a multifunctional electronic device described herein. Multifunction electronic device 800 may include some combination of processor 805, display 810, user interface 815, graphics hardware 820, device sensors 825 (e.g., proximity sensor/ambient light sensor, accelerometer and/or gyroscope), microphone 830, speaker(s) 840, communications circuitry 845, digital image capture circuitry 850 (e.g., including camera system), memory 860, storage device 865, and communications bus 870. Multifunction electronic device 800 may be, for example, a mobile telephone, personal music player, wearable device, tablet computer, and the like.

Processor 805 may execute instructions necessary to carry out or control the operation of many functions performed by device 800. Processor 805 may, for instance, drive display 810 and receive user input from user interface 815. User interface 815 may allow a user to interact with device 800. For example, user interface 815 can take a variety of forms, such as a button, keypad, dial, a click wheel, keyboard, display screen, touch screen, and the like. Processor 805 may also, for example, be a system-on-chip such as those found in mobile devices and include a dedicated graphics processing unit (GPU). Processor 805 may be based on reduced instruction-set computer (RISC) or complex instruction-set computer (CISC) architectures or any other suitable architecture and may include one or more processing cores. Graphics hardware 820 may be special purpose computational hardware for processing graphics and/or assisting processor 805 to process graphics information. In one embodiment, graphics hardware 820 may include a programmable GPU.

Image capture circuitry 850 may include one or more lens assemblies, such as 880A and 880B. The lens assemblies may have a combination of various characteristics, such as differing focal length and the like. For example, lens assembly 880A may have a short focal length relative to the focal length of lens assembly 880B. Each lens assembly may have a separate associated sensor element 890. Alternatively, two or more lens assemblies may share a common sensor element. Image capture circuitry 850 may capture still images, video images, enhanced images, and the like. Output from image capture circuitry 850 may be processed, at least in part, by video codec(s) 855 and/or processor 805 and/or graphics hardware 820, and/or a dedicated image processing unit or pipeline incorporated within circuitry 865. Images so captured may be stored in memory 860 and/or storage 865.

Memory 860 may include one or more different types of media used by processor 805 and graphics hardware 820 to perform device functions. For example, memory 860 may include memory cache, read-only memory (ROM), and/or random access memory (RAM). Storage 865 may store media (e.g., audio, image and video files), computer program instructions or software, preference information, device profile information, and any other suitable data. Storage 865 may include one more non-transitory computer-readable storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 860 and storage 865 may be used to tangibly retain computer program instructions or code organized into one or more modules and written in any desired computer programming language. When executed by, for example, processor 805 such computer program code may implement one or more of the methods described herein.

As described above, one aspect of the present technology is presenting a virtual object in a user's physical environment. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to train expression models. Accordingly, use of such personal information data enables users to estimate emotion from an image of a face. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIP4); whereas health data in other countries may be subject to other regulations and policies and should be handled accordingly. Hence different privacy practices should be maintained for different personal data types in each country.

It is to be understood that the above description is intended to be illustrative, and not restrictive. The material has been presented to enable any person skilled in the art to make and use the disclosed subject matter as claimed and is provided in the context of particular embodiments, variations of which will be readily apparent to those skilled in the art (e.g., some of the disclosed embodiments may be used in combination with each other). Accordingly, the specific arrangement of steps or actions shown in FIGS. 3-6 or the arrangement of elements shown in FIGS. 1, 2, and 7 should not be construed as limiting the scope of the disclosed subject matter. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A non-transitory computer readable medium comprising computer readable code executable by one or more processors to:
   obtain a first geometric representation and a second geometric representation corresponding to a physical surface in a real environment;
   determine an initialization location on the physical surface for a virtual object;
   determine one or more distance measurements between the first geometric representation and the second geometric representation; and
   select a geometric representation from among the first geometric representation and the second geometric representation for rendering the virtual object based on the one or more distance measurements.

2. The non-transitory computer readable medium of claim 1, wherein the one or more distance measurements comprises a distance between the first geometric representation and the second geometric representation at the initialization location.

3. The non-transitory computer readable medium of claim 1, wherein the one or more distance measurements comprises a distance between a first normal for the first geometric representation and a second normal for the second geometric representation at the initialization location.

4. The non-transitory computer readable medium of claim 1, wherein the first geometric representation is less granular than the second geometric representation, and
   wherein the computer readable code to select the geometric representation comprises computer readable code to, in accordance with a determination that the one or more distance measurements satisfies a closeness threshold, select the first geometric representation.

5. The non-transitory computer readable medium of claim 1, wherein the first geometric representation is less granular than the second geometric representation, and
   wherein the computer readable code to select the geometric representation comprises computer readable code to, in accordance with a determination that the one or more distance measurements fails to satisfy a closeness threshold, select the second geometric representation.

6. The non-transitory computer readable medium of claim 1, wherein the first geometric representation comprises a planar representation and wherein the second geometric representation comprises a three-dimensional representation.

7. The non-transitory computer readable medium of claim 1, further comprising computer readable code to:
render the virtual object at a location determined based on the selected geometric representation.

8. A system comprising:
one or more processors; and
one or more computer readable media comprising computer readable code executable by the one or more processors to:
obtain a first geometric representation and a second geometric representation corresponding to a physical surface in a real environment;
determine an initialization location on the physical surface for a virtual object;
determine one or more distance measurements between the first geometric representation and the second geometric representation; and
select a geometric representation from among the first geometric representation and the second geometric representation for rendering the virtual object based on the one or more distance measurements.

9. The system of claim 8, wherein the one or more distance measurements comprises a distance between the first geometric representation and the second geometric representation at the initialization location.

10. The system of claim 8, wherein the one or more distance measurements comprises a distance between a first normal for the first geometric representation and a second normal for the second geometric representation at the initialization location.

11. The system of claim 8, wherein the first geometric representation is less granular than the second geometric representation, and
wherein the computer readable code to select the geometric representation comprises computer readable code to, in accordance with a determination that the one or more distance measurements satisfies a closeness threshold, select the first geometric representation.

12. The system of claim 8, wherein the first geometric representation is less granular than the second geometric representation, and
wherein the computer readable code to select the geometric representation comprises computer readable code to, in accordance with a determination that the one or more distance measurements fails to satisfy a closeness threshold, select the second geometric representation.

13. The system of claim 8, wherein the first geometric representation comprises a planar representation and wherein the second geometric representation comprises a three-dimensional representation.

14. The system of claim 8, further comprising computer readable code to:
render the virtual object at a location determined based on the selected geometric representation.

15. A method comprising:
obtaining a first geometric representation and a second geometric representation corresponding to a physical surface in a real environment;
determining an initialization location on the physical surface for a virtual object;
determining one or more distance measurements between the first geometric representation and the second geometric representation; and
selecting a geometric representation from among the first geometric representation and the second geometric representation for rendering the virtual object based on the one or more distance measurements.

16. The method of claim 15, wherein the one or more distance measurements comprises a distance between the first geometric representation and the second geometric representation at the initialization location.

17. The method of claim 15, wherein the one or more distance measurements comprises a distance between a first normal for the first geometric representation and a second normal for the second geometric representation at the initialization location.

18. The method of claim 15, wherein the first geometric representation is less granular than the second geometric representation, and
wherein selecting the geometric representation comprises, in accordance with a determination that the one or more distance measurements satisfies a closeness threshold, selecting the first geometric representation.

19. The method of claim 15, wherein the first geometric representation is less granular than the second geometric representation, and
wherein selecting the geometric representation comprises, in accordance with a determination that the one or more distance measurements fails to satisfy a closeness threshold, select the second geometric representation.

20. The method of claim 15, wherein the first geometric representation comprises a planar representation and wherein the second geometric representation comprises a three-dimensional representation.

* * * * *